United States Patent [19]

Ferree et al.

[11] Patent Number: 5,018,901
[45] Date of Patent: May 28, 1991

[54] RING LATCHED COUPLER

[75] Inventors: Herbert E. Ferree, Greensburg; Harry N. Andrews, Export; Frank W. Cooper, Jr.; Joseph R. Herberg, both of Monroeville Borough, all of Pa.

[73] Assignee: Space Industries Partnership, L. P., Webster, Tex.

[21] Appl. No.: 222,583

[22] Filed: Jul. 21, 1988

[51] Int. Cl.⁵ ............................................. F16B 7/20
[52] U.S. Cl. ................... 403/349; 403/316; 403/353
[58] Field of Search ............... 403/348, 349, 351, 319, 403/316, 317, 320, 315, 353, 322, 326, 13, 365

[56] References Cited

U.S. PATENT DOCUMENTS

| | | | |
|---|---|---|---|
| 1,867,950 | 7/1932 | Norley | 403/316 |
| 2,189,056 | 2/1940 | Carington | 403/348 |
| 2,219,907 | 10/1940 | Ross | 403/349 X |
| 2,526,998 | 10/1950 | Davis | 403/316 X |
| 2,803,032 | 8/1957 | Barnsley | 403/365 X |
| 2,833,158 | 5/1958 | Damon | 403/349 X |
| 3,822,951 | 7/1974 | Bornzin | 403/316 |
| 3,986,780 | 10/1976 | Nivet | 403/353 |
| 4,066,330 | 1/1978 | Jones | 403/322 X |
| 4,361,196 | 11/1982 | Hoyle, Jr. | |
| 4,472,163 | 9/1984 | Bottini | 403/349 X |
| 4,577,127 | 3/1986 | Ferree et al. | |
| 4,632,195 | 12/1986 | Emmerich | 403/348 X |
| 4,679,959 | 7/1987 | Cavallaro | 403/317 X |
| 4,756,638 | 7/1988 | Neyret | 403/349 X |
| 4,766,775 | 8/1988 | Hodge | 403/13 X |

OTHER PUBLICATIONS

NASA Technical Memorandum; Skylab Experiment M487 Habitability/Crew Quarters, Oct. 1975.
Sensoflex/Astek End Of Arm Products Product Digest [n.d.].
Updated Drawing For Mecanotron Robotics For A Universal Robot Wrist W/Quick Change Tooling, Drawn by S. Walsh, May 30, 1984.

Primary Examiner—Peter M. Cuomo
Attorney, Agent, or Firm—Venable, Baetjer and Howard

[57] ABSTRACT

A ring latched coupler includes a male assembly having a plurality of grooves and a female assembly having a plurality of slots. The female assembly is configured to receive the male assembly. A latching ring is rotatably carried by the female assembly. The latching ring is configured such that upon rotation of the male and female assemblies relative to the latching ring, portions of the latching ring extend through the slots in the female assembly to engage grooves in the male assembly.

3 Claims, 10 Drawing Sheets

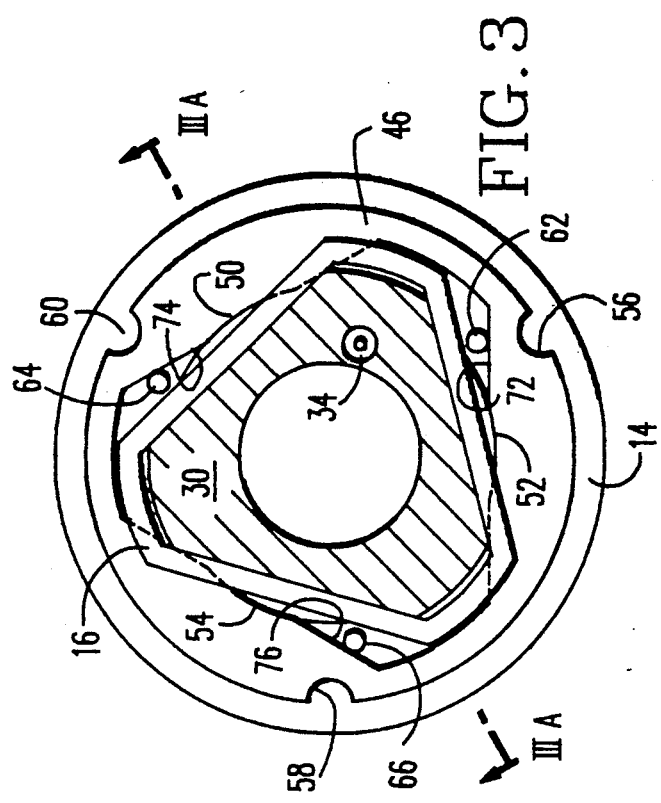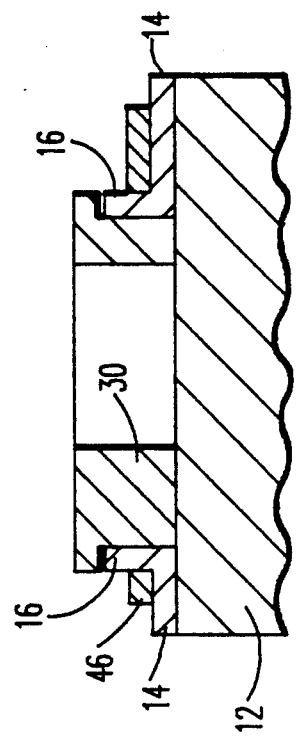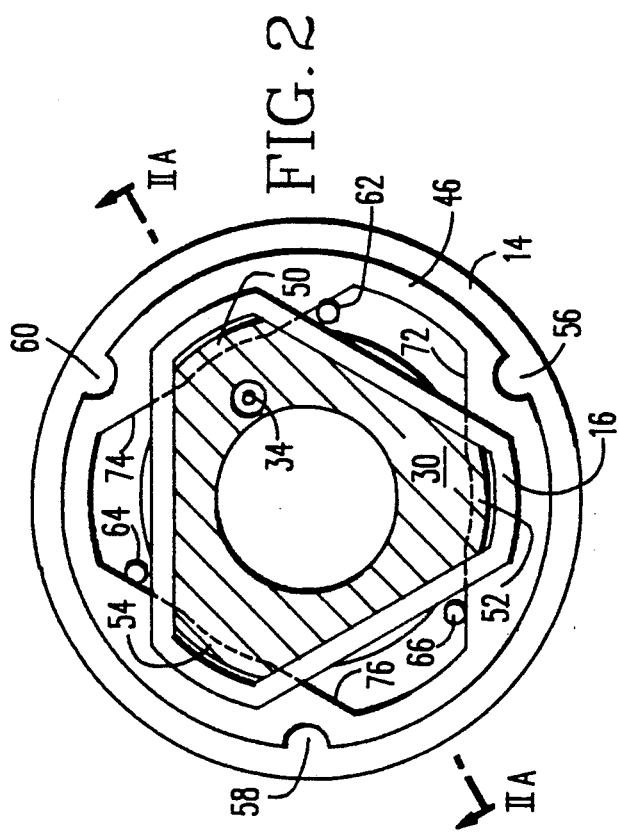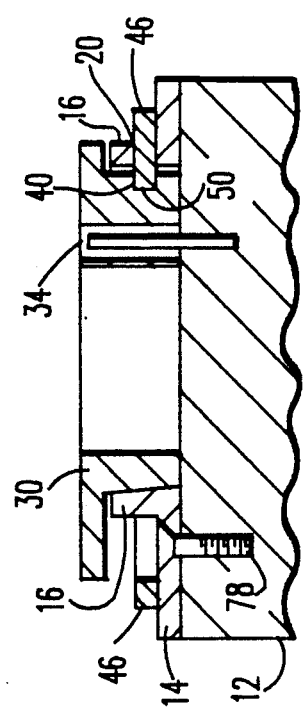

RING LATCHED COUPLER

CROSS-REFERENCE TO RELATED APPLICATION

Related subject matter is disclosed and claimed in U.S. Pat. application Ser. No. 222,584, entitled "Portable Robotic Tool Rack", filed on July 21, 1988, now U.S. Pat. No. 4,941,577.

BACKGROUND OF THE INVENTION

1. Field of the Invention

The present invention is directed generally to mechanical couplers and more particularly to mechanical couplers used in combination with robots.

2. Description of the Prior Art

Many end effectors and tool couplings exist but none are known which can couple a tool several inches in diameter to an arm or other machine in a length of less than one inch. For example, one known type of coupler which is used in combination with the Westinghouse Electric Corporation's remotely operable service arm requires an axial length of 2.75 inches (7 cm) and requires a hydraulic cylinder for latching. Although such couplers are ideally suited for applications on earth, space applications, where size and weight are critical, require the development of different types of couplers.

When designing a coupler for use in space, different design criteria must be taken into consideration. For example, by reducing the length required between the end of a robot arm and the tool, space can be saved, but this requires that the coupler operate without any active devices. The coupler must be as light in weight as possible consistent with strength and operational accuracy. Less mass in the coupler means more mass can be added to the load rating of a space vehicle. It is also desirable to construct a coupler which can be latched and unlatched without additional active devices; that tends to improve reliability.

Thus, the need exists for a short coupler which does not require active devices for the latching and unlatching operations.

SUMMARY OF THE PRESENT INVENTION

The present invention is directed to a ring-latched coupler comprising a male assembly and a complementary female assembly adapted to receive the male assembly. A latching ring is rotatably carried by the female assembly. A portion of the latching ring is configured such that upon rotation of the male and female assemblies relative to the ring, it effects engagement with the male assembly.

According to one embodiment of the present invention, the male assembly includes a plurality of grooves and the female assembly includes a plurality of slots. The portion of the latching ring effecting engagement with the male assembly includes portions of the latching ring adapted to extend through the slots of the female assembly to engage the grooves of the male assembly.

According to another embodiment of the present invention, the female assembly includes a plurality of balls. The portion of the latching ring effecting engagement with the male assembly includes a camming surface for urging the balls of the female assembly to engage a groove in the male assembly.

Other embodiments of the present invention include the use of indexing pins to insure proper alignment of the male and female assemblies, complementary electrical connectors, and locking pins or locking solenoids to prevent unwanted movement of the latching ring.

Another embodiment of the present invention includes the use of a bearing disk or ball bearings which enable one of the male or female coupling assemblies to rotate with the other of the assemblies.

The present invention also includes a method of connecting two members comprising the steps of inserting a male assembly having a plurality of grooves into a female assembly having a plurality of complementary slots and rotating the male and female assemblies relative to a latching ring such that portions of the ring are caused to extend through the slots to engage the grooves.

The present invention provides a short, light weight coupler which can be used, for example, on the end of a robot arm for enabling the robot arm to be coupled to a plurality of end effectors. The coupler is short in the axial direction, light weight, and performs the latching and unlatching operations without the need for a separate actuator. These and other advantages and benefits of the present invention will become apparent from a description of preferred embodiments hereinbelow.

BRIEF DESCRIPTION OF THE DRAWINGS

In order for the present invention to be easily understood and readily practiced, preferred embodiments will be described, by way of example only, in connection with the Figs. wherein:

FIGS. 1, 1A and 1B are perspective views of a female coupling assembly, a latching ring, and a male coupling assembly, respectively;

FIG. 2 illustrates the components of FIGS. 1, 1A and 1B in the assembled and locked position;

FIG. 2A is a cross sectional view of the assembled components of FIG. 2 taken along the lines II—II;

FIG. 3 illustrates the components of FIGS. 1, 1A and 1B in the assembled and unlocked position;

FIG. 3A is a cross sectional view of the assembled components of FIG. 3 taken along the lines III—III;

DESCRIPTION OF THE PREFERRED EMBODIMENT

Figure 1:
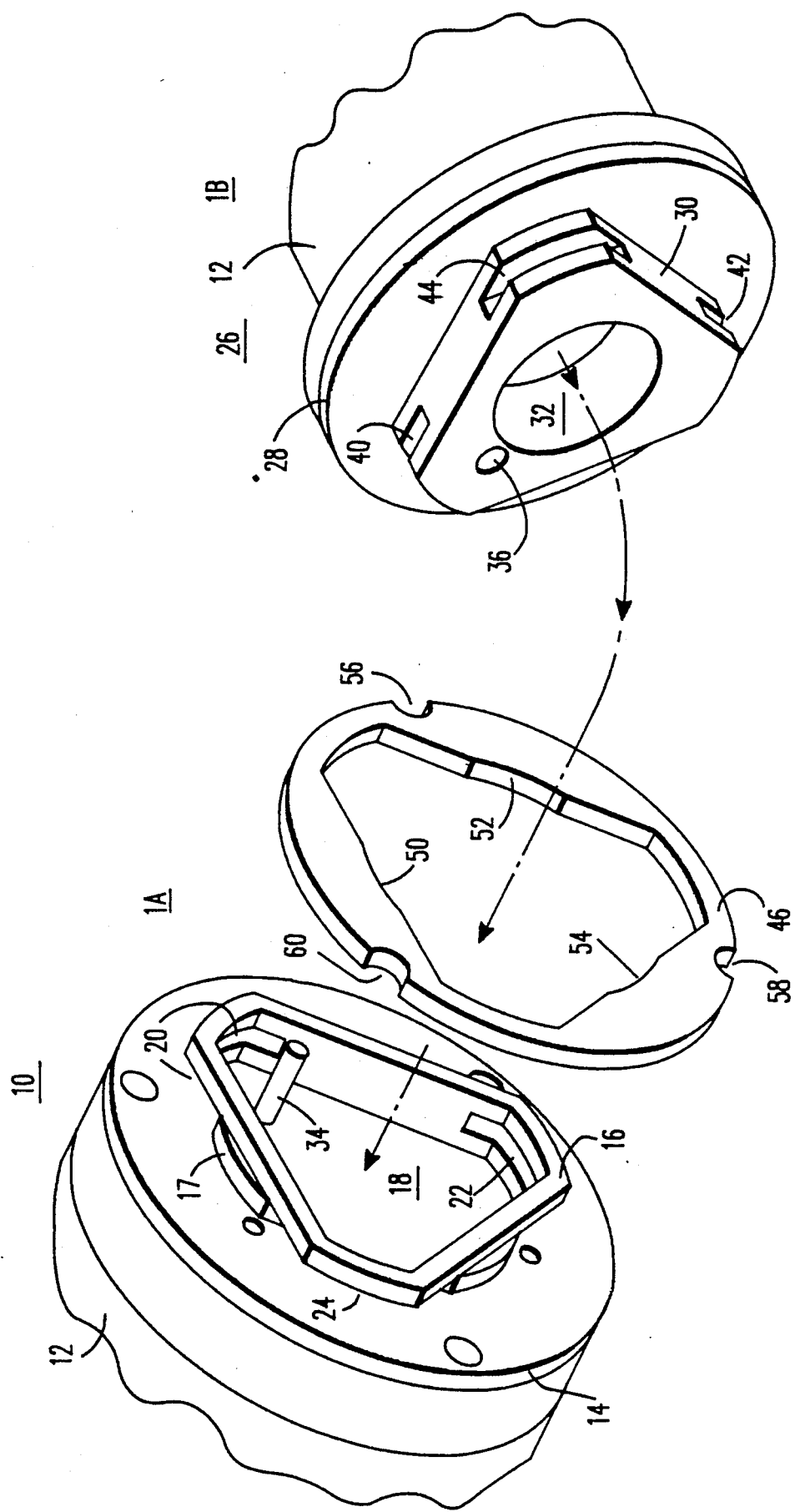

The components comprising a coupling assembly constructed according to the teachings of the present invention are illustrated in FIGS. 1, 1A and 1B. FIG. 1 illustrates a female coupling assembly 10 carried by a tool or robot arm 12. The female coupling assembly 10 is comprised of a base 14 carrying a member 16 which extends substantially vertically from the base 14. The vertical member 16 is formed substantially in the shape of a triangle which defines an enclosed area 18 adapted to receive a male coupling assembly 26 shown in FIG. 1B. The enclosed area 18 contains an indexing pin 34. The triangularly-shaped vertical member 16 has slots 20, 22 and 24 formed in each point of the triangle. The vertical member 16 also has a cylindrically shaped lower surface 17 which guides and centers a latching ring 46. The cylindrical surface is interrupted only by slots 20, 22 and 24.

The male assembly 26 shown in FIG. 1B is complementary to the female assembly 10 shown in FIG. 1. The male coupling assembly 26 may be carried by either the tool or robot arm 12. The reader should understand that if the female coupling assembly 10 is carried by the robot arm, then the male coupling assembly is carried by the tool and vice versa.

The male coupling assembly 26 is comprised of a base 28 carrying a protruding triangularly-shaped member 30. The protruding member 30 defines an open area in its center 32 in which electrical connectors (not shown) may be located. The protruding member 30 has an opening 36 formed therein for receiving the indexing pin 34 of the female assembly. The triangularly-shaped protruding member 30 is provided with a plurality of grooves 40, 42, and 44. The function of the slots of the female assembly and grooves of the male assembly will be described in greater detail in conjunction with FIGS. 2 and 3.

Completing the description of the assemblies which comprise the coupler of the present invention, FIG. 1A illustrates a latching ring 46. The latching ring 46 has a substantially circular outside profile and a substantially triangular inside profile. The inside profile of the latching ring 46 is such that the latching ring fits over the triangularly-shaped vertical member 16 carried by the base 14 of the female assembly. The latching ring 46 is rotatably carried by the female coupling assembly 10 as shown in FIGS. 2 and 3.

FIG. 2 illustrates the male coupling assembly 26 inserted into the female coupling assembly 10 with the latching ring 46 in a locked position. In the locked position, a first portion or fixed working surface 50 of the latching ring 46 extends through slot 20 of the vertical member 16 and engages groove 40 of protruding member 30. That is also seen in the cross sectional view shown in FIG. 2A. Similarly, a second portion or fixed working surface 52 of the latching ring 46 extends through slot 22 and engages groove 42. Finally, a third portion or working surface 54 extends through slot 24 to engage groove 44. In this manner, the latching ring positively engages both the vertical member 16 of the female coupling assembly 10 and the protruding member 30 of the male coupling assembly 26. FIG. 2A also illustrates the inside straight surfaces of the vertical member 16 may include a non-locking taper mating with a complementary taper of the protruding member 30 to provide a no clearance, precisely located mating of the two parts. At the points of the triangle, clearance is provided because close fits in those regions would be redundant and might interfere with perfect mating.

The latching ring 46 is provided with three notches 56, 58 and 60 seen in FIGS. 1A, 2 and 3. When the female coupling assembly 10 is carried by a robot arm or the like, the notches may be engaged by pins, or the like, carried by a tool rack (not shown). The tool rack would carry a tool and the tool would carry the male coupling assembly 26. Thus, when the female assembly 10 carried by the end of a robot arm is brought into engagement with the male assembly 26 located on the end of a tool, the notches 56, 58 and 60 of the latching ring 46 engage the pins on the tool rack (not shown). A suitable tool rack is disclosed in co-pending U.S. Application Serial No. 222,584 filed July 21, 1988, which is assigned to the same assignee as the present application and which is hereby incorporated by reference.

Operation of the end of arm actuator carrying the female coupling assembly 10 causes the female coupling assembly 10 to rotate in a counter-clockwise direction from the unlocked position shown in FIG. 3 to the locked position shown in FIG. 2. A cross sectional view of the unlocked position is provided in FIG. 3A. The male coupling assembly 26, by virtue of the protruding member 30, also rotates in a counter-clockwise direction. However, the latching ring 46 is prevented from rotating by the pins engaging the notches 56, 58 and 60. Thus, relative rotation between the latching ring 46 and the male and female coupling assemblies 10 and 26, respectively, is effected. Through this relative rotation, the portions 50, 52, and 54 of the latching ring 46 are caused to extend through slots 20, 22 and 24 to engage grooves 40, 42 and 44, respectively.

Uncoupling is effected by rotating the female coupling assembly 10 and the male coupling assembly 26 in a clockwise direction from the position shown in FIG. 2 to the position shown in FIG. 3. Rotation in the clockwise direction ceases when pins 62, 64 and 66, seen in FIGS. 2 and 3, encounter an inside surface 72, 74 and 76 respectively, of the latching ring 46. The pins 62, 64 and 66 are positioned to allow the female coupling assembly 10 and male coupling assembly 26 to rotate just enough for the areas 50, 52 and 54 of the latching ring 46 to disengage grooves 40, 42 and 44, thus releasing the male coupling assembly 26, but not enough to allow the latching ring 46 to come free of the female coupling assembly 10.

The female coupling assembly 10 may be connected to the tool or robot arm 12 through the use of flathead screws 78 (as seen in FIG. 2A) or similar fastening means. The male coupling assembly 26 may be a one piece unit which is either fastened to the tool or robot arm 12 or, in the case of a tool, may be fabricated as an integral part of the tool to provide a tool having an even shorter coupling. The coupling of the present invention can be constructed to have an overall length of approximately 0.5 inches (1.25 cm) as compared to commercially available industrial couplers which may have a length of approximately 2.75 inches (7 cm). Where one of the female coupling assembly or male coupling assembly is formed as an integral part of the tool, it is estimated the coupler may be as short as 0.37 inches (1 cm). Hardened aluminum such as alloy 6061-T6 should have adequate strength to construct a coupler according to the teachings of the present invention. With an outside diameter of about five inches (12.7 cm) the coupling of the present invention can withstand torques of over 2,000 inch-pounds (226 Joules).

The coupler of the present invention is extremely short along the axis of rotation. The coupler is constructed of aluminum and therefore is light-weight while maintaining strength and operational accuracy. The female coupling assembly 10 and male coupling assembly 26 can be connected by using the actuator on a robot arm or the like such that additional actuators are not required to perform the latching and unlatching operations. In the exemplary dimensions given, a coupler can be constructed according to the present invention which can withstand at least 2,000 inch-pounds (226 Joules) of torque in all axes of rotation. The coupler can withstand at least 50 pounds (222.4 Newtons) of tensile or compressive force. Provisions for passage of control cables or electrical connectors can also be provided. The coupler is simple, reliable and low cost.

Another embodiment of the present invention is illustrated in FIGS. 4–9. Where possible, components performing the same function as those of FIGS. 1, 1A, 1B, 2, and 3 are given the same reference numerals.

Figure 4:
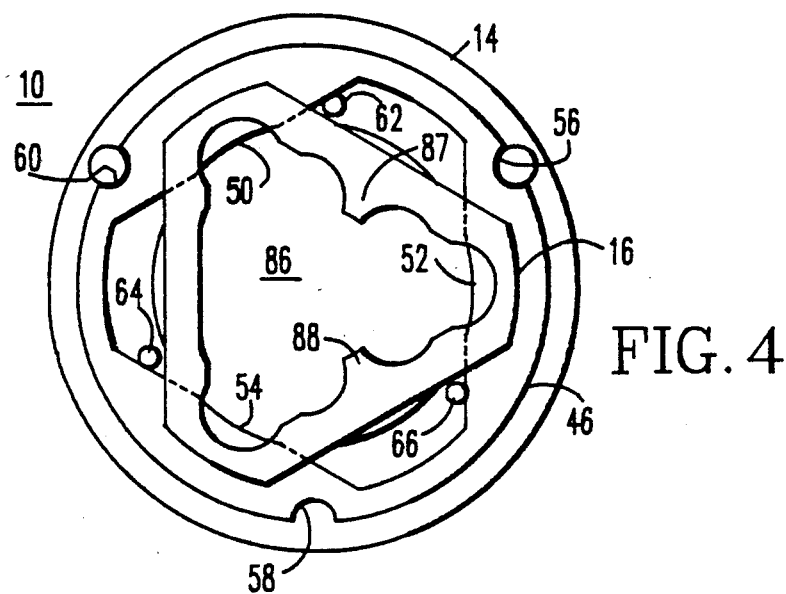
FIG. 4 illustrates another embodiment of a female coupling assembly and a latching ring.

In FIG. 4, the female coupling assembly 10 and latching ring 46 are illustrated. The latching ring 46 is in the locked position such that the first portion 50, second portion 52, and third portion 54 of the latching ring 46 extend through the slots 20, 22 and 24 of the vertical member 16. The vertical member 16 carries two indexing portions 87 and 88.

Figure 5:
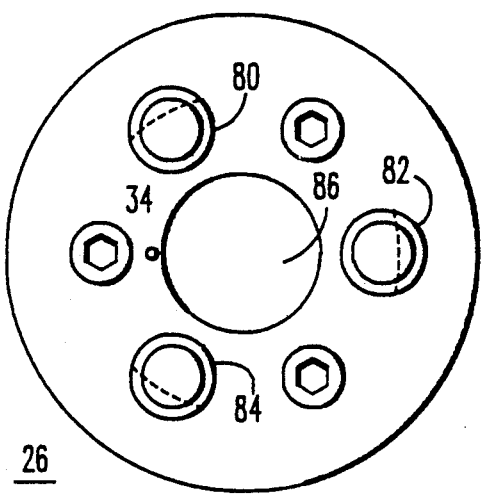
FIG. 5 illustrates another embodiment of a male coupling assembly.

The male coupling assembly 26 is illustrated in FIG. 5. In FIG. 5, the male assembly 26 is seen to include three pins 80, 82 and 84. The pins are tapered as seen in FIG. 7. The male coupling assembly 26 also includes a center portion 86 which may be used to carry electrical connections or the like (not shown). The indexing portions 87 and 88 of the female assembly cooperate with the indexing pin 34 of the male assembly such that the male coupling assembly 26 can be inserted into the female coupling assembly 10 in only one orientation as shown in FIG. 6.

Figure 6:
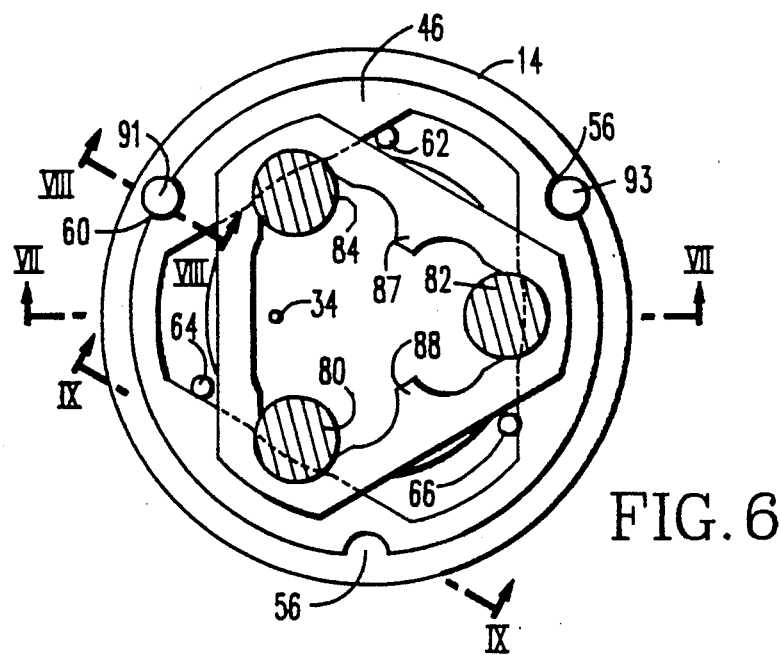
FIG. 6 illustrates the components of FIGS. 4 and in an assembled and locked position.
Figure 7:
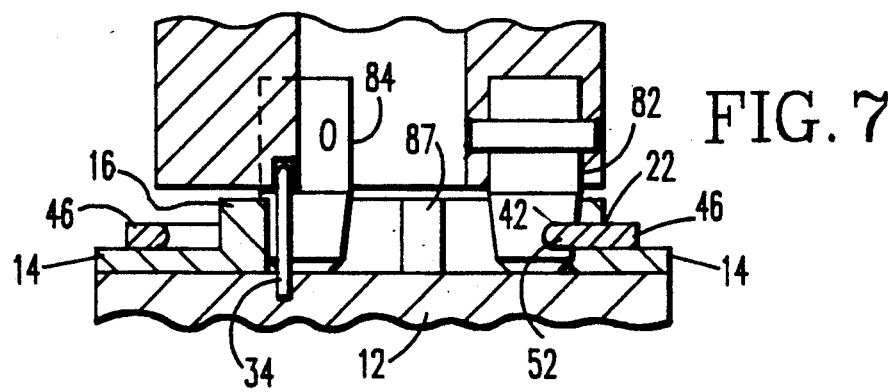
FIGS. 7, 8 and 9 are cross sectional views of the assembled components of FIG. 6 taken along the lines VII—VII, VIII—VIII and IX—IX, respectively.

In FIG. 6, the pins 80, 82 and 84 of the male coupling assembly 26 are shown inserted in the female coupling assembly 10 and the latching ring 46 is in the locked position. The embodiment of the invention shown in FIGS. 4–9 operates in the same manner as the embodiment of the invention previously described. As can be seen clearly in FIG. 7, which is a cross sectional view of the assembled components shown in FIG. 6, the second portion 52 of the latching ring 46 extends through the slot 22 of the vertical member 16 to engage the groove 42 of the pin 82.

The latching ring 46 shown in FIG. 6 is tapered (as a wedge) in the area of the first portion 50, second portion 52, and third portion 54. The taper of the second portion 52 can be seen in FIG. 9. The taper is such that upon initial engagement of the portion of the latching ring 46 with its respective groove, clearance exists between the top and bottom surfaces of the latching ring and the top and bottom surfaces of the groove. However, upon rotation of the female coupling assembly 10 and the male coupling assembly 26, those clearances disappear. That camming action assures that the tapers of the pins 80, 82 and 84 and the complementary tapers of the female coupling assembly 10 are firmly drawn together.

Figure 8:
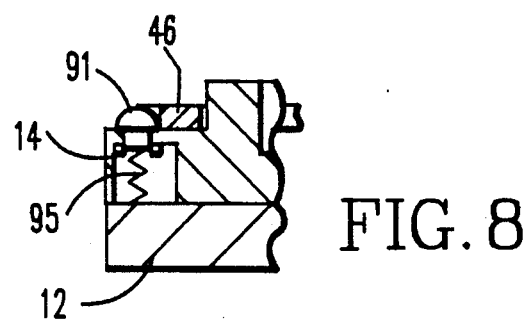
Figure 9:
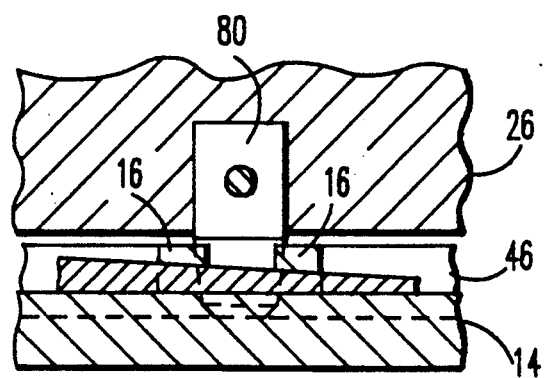

The female coupling assembly 10 in FIG. 6 also carries two locking buttons 91 and 93, one of which is shown in detail in FIG. 8. As seen in FIG. 8, the locking button 93 is provided with a spring 95 for urging the button to extend beyond the surface of the base 14 of the female coupling assembly 10. The locking buttons 91 and 93 are positioned to extend into the notches 60 and 56, respectively, of the latching ring 46 when the latching ring is in the locked position. The locking buttons thus prevent the latching ring from inadvertently vibrating out of the locked position.

Figure 20:
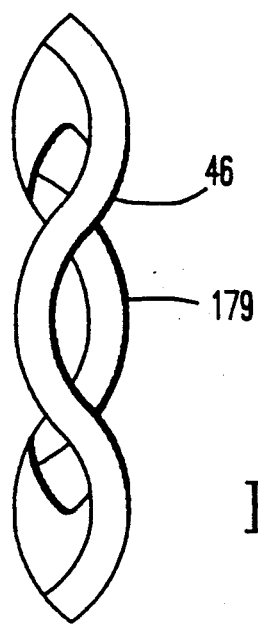
FIG. 20 illustrates a latching ring which can withstand compressive forces.

Limited compliance can be provided in the coupler of the present invention very simply without any additional parts. This can be accomplished by replacing the rigid latching ring 46 with a ring shaped somewhat like a "wave spring washer" as shown in FIG. 20. Such a ring would be constructed to be thinner than the rigid latching ring 46 previously described. The amount of compliance movement is determined by the difference between the thickness of the ring and the space in the grooves 40, 42 and 44 which the ring engages for locking purposes. Very high force compliance can be provided by using three waves which are contained entirely within the width of the grooves, pressing against the walls of the grooves and against the walls of the slots. Lower force compliance can be obtained by decreasing the outer notched space for the latching ring and/or the thickness of the latching ring in each of the slots 20, 22 and 24 which hold the spring waves down against the base 14.

Figure 10:
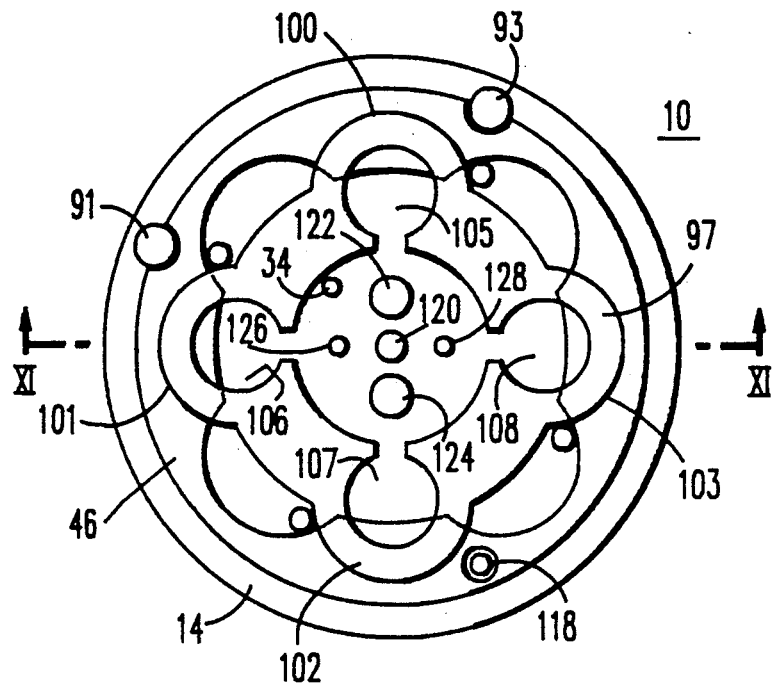
FIG. 10 illustrates another embodiment of a female coupling assembly and a latching ring.
Figure 11:
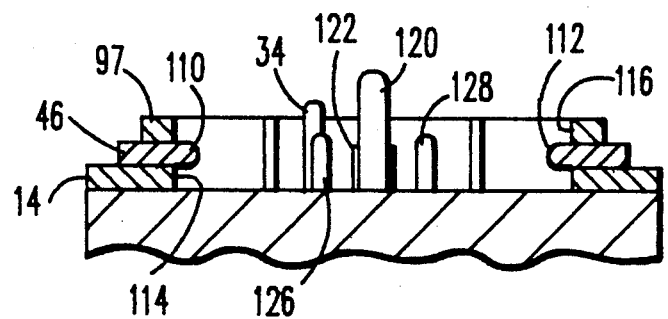
FIG. 11 is a cross sectional view of the female coupling assembly and latching ring of FIG. 10 taken along the lines XI—XI.

Another embodiment of the present invention is illustrated in FIGS. 10–14. In FIG. 10, the base member 14 has a substantially vertical member 97 extending therefrom which provides the same function as the previously described member 16. The vertical member 97 is substantially circular in shape with the circular shape interrupted by four protrusions 100, 101, 102 and 103. The protrusions define cylindrical wells 105, 106, 107 and 108 adapted to receive four pins 105', 106', 107' and 108', respectively, carried by the male coupling assembly shown in FIG. 12. The pins carried by the male coupling assembly contain grooves for receiving portions of the latching ring 46. In this embodiment, however, the latching ring has four portions which extend through four slots in the vertical member 97 to engage four grooves, one groove being located in each of the pins carried by the male coupling assembly illustrated in FIG. 12. A cross sectional view of the female coupling assembly 10 is shown in FIG. 11 which illustrates two portions 110 and 112 of the latching ring extending through two slots 114 and 116, respectively, in the vertical member 97.

Figure 14:
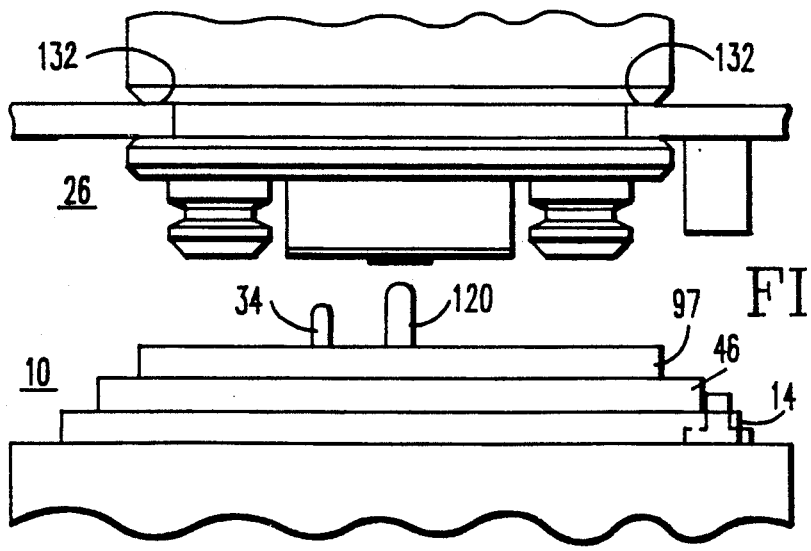
FIG. 14 illustrates an impending connection between the female coupling assembly of FIG. 10 and the male coupling assembly of FIG. 12.

The fourth pin in this embodiment provides some redundancy. If one pin is broken, the coupler can still operate at a slightly reduced load capacity. This embodiment of the present invention illustrates that the pins need not be tapered as shown in FIG. 14. Straight pins have the advantage of allowing the mating surfaces of the male and female coupler assemblies to come fully together, assuring that they will be parallel and also providing a more complete shielding of the electrical connections.

In FIG. 10, a solenoid locking pin 118 has been added in addition to the locking buttons 91 and 93. The solenoid locking pin 118 can be used in embodiments where the locking buttons 91 and 93 cannot be used, for example where the female coupling assembly 10 is carried by a base mounting assembly such as those shown in FIGS. 18 and 19, or to add a measure of redundancy.

Also illustrated in FIG. 10 is a centering pin and ground 120. Two electrical coaxial cable connectors 122 and 124 and two electrical pins 126 and 128 are also provided.

Figure 13:
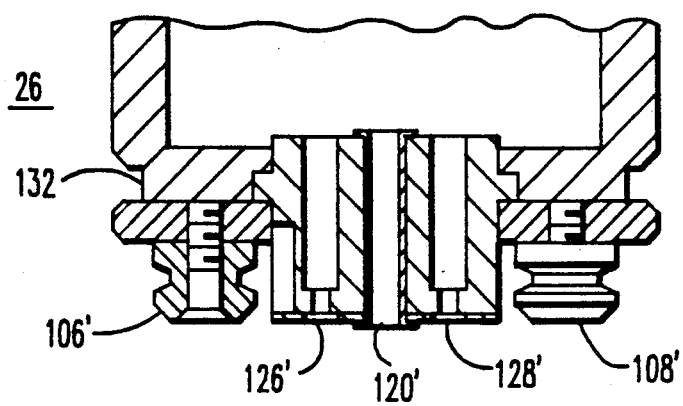
FIG. 13 is a cross sectional view of the male coupling assembly of FIG. 12 taken along the lines XII—XII.
Figure 12:
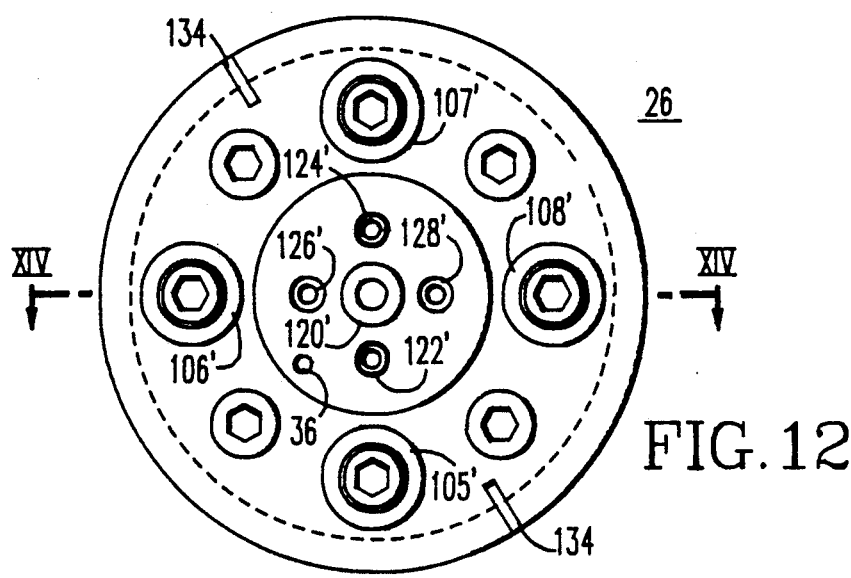
FIG. 12 illustrates another embodiment of a male coupling assembly.

The male coupling assembly 26 shown in FIGS. 12 and 13 carries complimentary coaxial connectors 122' and 124' for mating with the coaxial connectors 122 and 124, respectively, and complementary connectors 126' and 128' for mating with electrical pins 126 and 128, respectively. A complimentary connector 120' is also provided for receiving the centering pin and ground connection 120.

An impending connection between a female coupling assembly 10 of the type shown in FIG. 10 and a male coupling assembly 26 of the type shown in FIG. 12 is illustrated in FIG. 14. As can be seen, the centering pin and ground connection 120 contacts the male coupling assembly 26 first followed by contact of the indexing pin 34 with the hole 36. With the centering pin and ground connection 120 and the indexing pin 34 properly aligned with their counterparts in the male coupling assembly 26, proper connection of the electrical connectors is assured.

Finally, in FIG. 12 a pair of detent grooves 134 is illustrated while in FIG. 13 a tool groove 132 is illustrated. The detent grooves 134 and tool groove 132 may be useful for retaining a tool within a tool rack such as that disclosed in the aforementioned U.S. Pat. Application Ser. No. 222,584.

Figure 15:
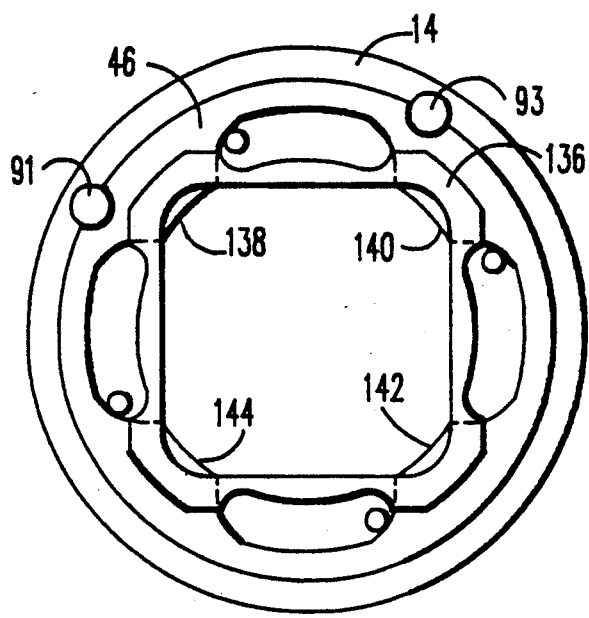
FIG. 15 illustrates another embodiment of a female coupling assembly and a latching ring.

FIG. 15 illustrates another embodiment of the present invention. In FIG. 15, the base member 14 carries a vertical member 136 which is substantially square in shape. A slot (not shown) is formed in each of the corners of the vertical member 36. The latching ring 46 is shown in the locked position. As can be seen in FIG. 15, there are four portions of the latching ring 138, 140, 142 and 144 which extend through the grooves in the vertical member 136. These portions of the latching ring 46 will engage grooves in a male coupling assembly (not shown) configured to be received by the vertical member 136. This embodiment demonstrates that the concepts of the present invention may be applied to a wide variety of male and female coupling assembly configurations. The present invention is not restricted to any particular configuration for the male and female coupling assemblies.

Figure 17:
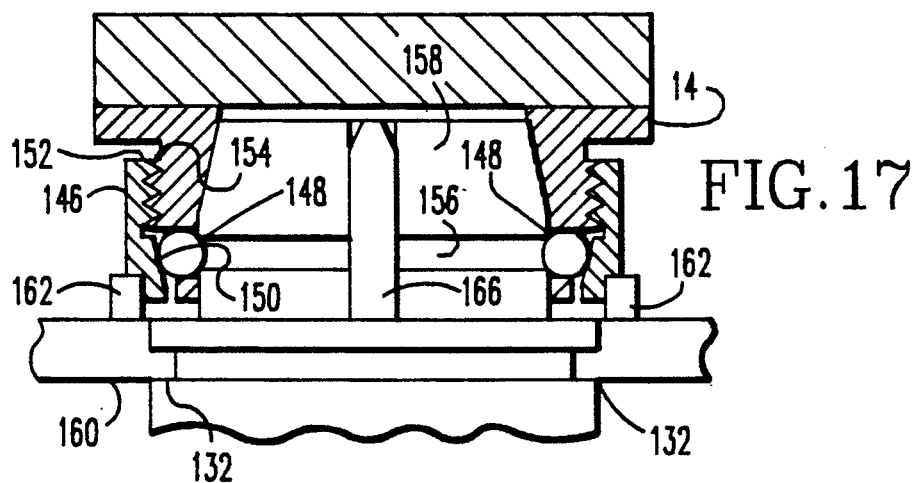
FIG. 17 is a cross sectional view of the assembled components of FIG. 16 taken along the lines XVII—XVII.
Figure 16:
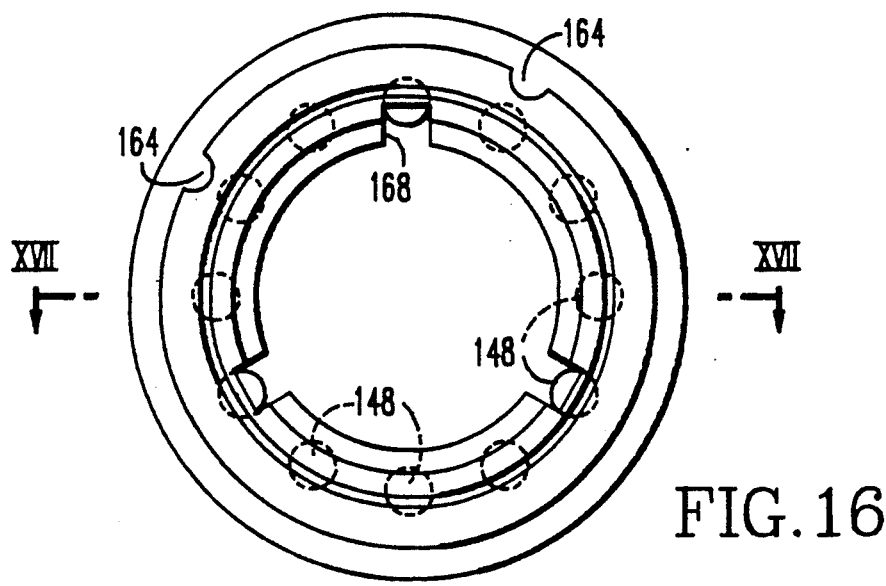
FIG. 16 illustrates another embodiment of a female coupling assembly, with a male coupling assembly inserted therein, and a latching ring.

Another embodiment of the present invention is illustrated in FIGS. 16 and 17. As in all of the embodiments of the present invention, a portion or portions of a latching ring 146 effects engagement with the male coupling assembly 158. In the embodiment of the invention shown in FIGS. 16 and 17, the female coupling assembly 10 carries a plurality of ball bearings 148 or the like. The latching ring 146 has a camming surface 150 which determines the direction in which the ball bearings 148 will be urged. The latching ring 146 also carries threads 152 which mate with threads 154 of the female coupling assembly. When the latching ring 146 moves in an upward axial direction as seen in FIG. 17, the camming surface 150 of the latching ring 146 urges the ball bearings 148 into a groove 156 formed in the male coupling assembly 158.

The tool carrying the male coupling assembly 158 may be carried in a tool rack 160 having pins 162 for engaging notches 164 formed in the latching ring 146. Finally, keys 166 may be carried by the male coupling assembly 158 which must be aligned with key-ways 168 formed in the female coupling assembly 10 to insure proper alignment.

When the coupler of the present invention is used for coupling with a mounting base on an Industrial Space Facility or the like, the operation must be somewhat different although the end of arm actuator of the robot is still used to achieve latching without the need for an additional actuator. ("Industrial Space Facility" is a trademark of Space Industries, Inc.). Two embodiments illustrating the present invention modified to be used as a base mount are shown in FIGS. 18A, 18B, 19A and 19B. FIGS. 18A, 18B, 19A and 19B illustrate a male coupling assembly 26 adapted to be used as a base mount. The primary difference between this embodiment and the other embodiments is that in this embodiment means must be provided to enable the male coupling assembly 26 to rotate with the female coupling assembly 10. In the embodiment shown in FIGS. 18A and 18B, the means for providing rotation takes the form of ball bearings 170 carried within a bearing housing 171. The means for providing rotation may also take the form of a bearing disk 172 used in conjunction with a mounting plate 173 as shown in FIGS. 19A and 19B. A detent screw 175 is also provided.

Figure 18B:
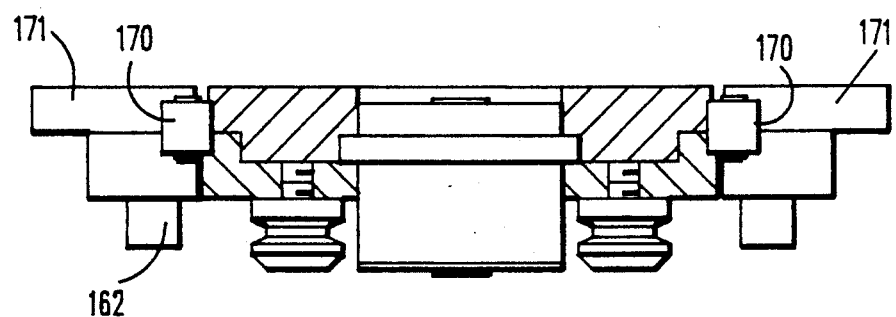
FIGS. 18B and 19B are cross sectional views of the mounting assemblies of FIGS. 18A and 19A, respectively, taken along the lines XVIII—XVIII and XIX—XIX.
Figure 18A:
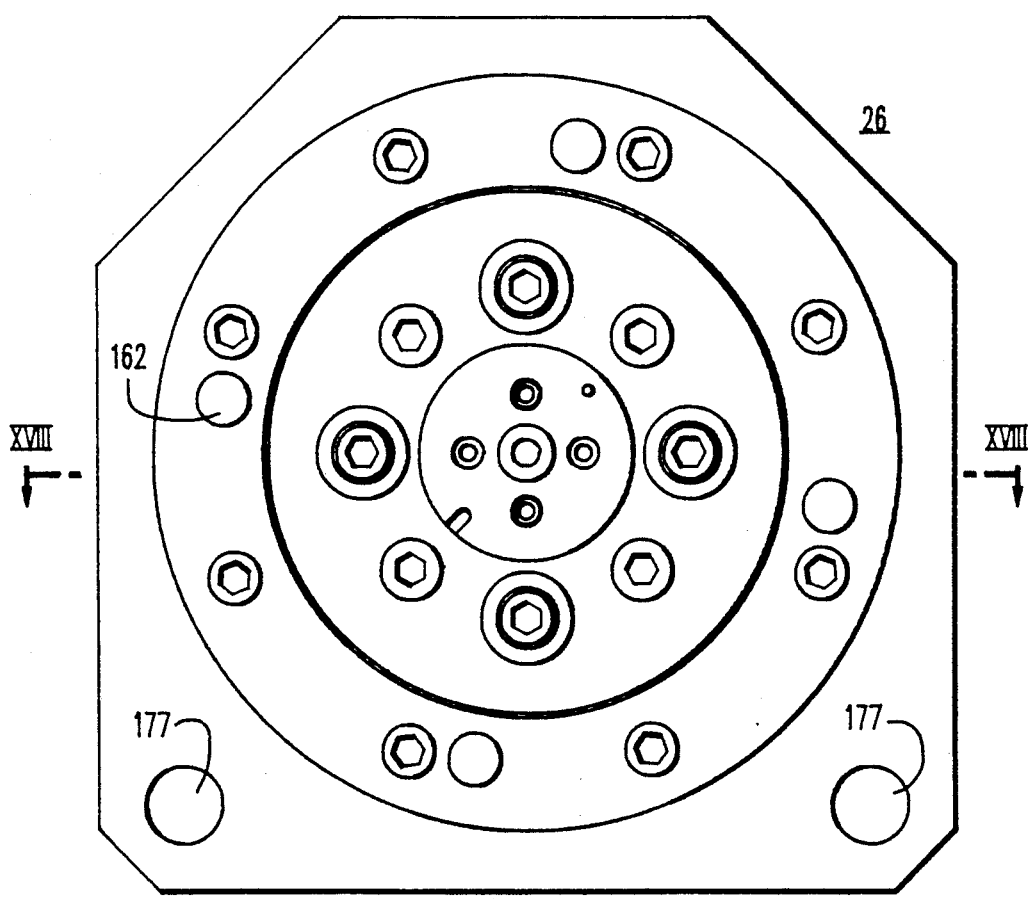
FIGS. 18A and 19A illustrate two embodiments of a mounting assembly.
Figure 19B:
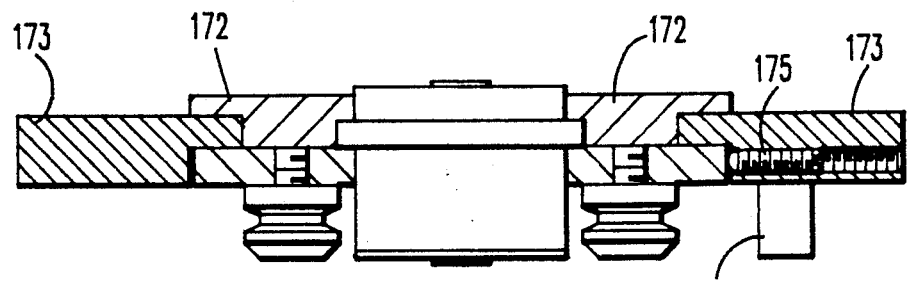
Figure 19A:
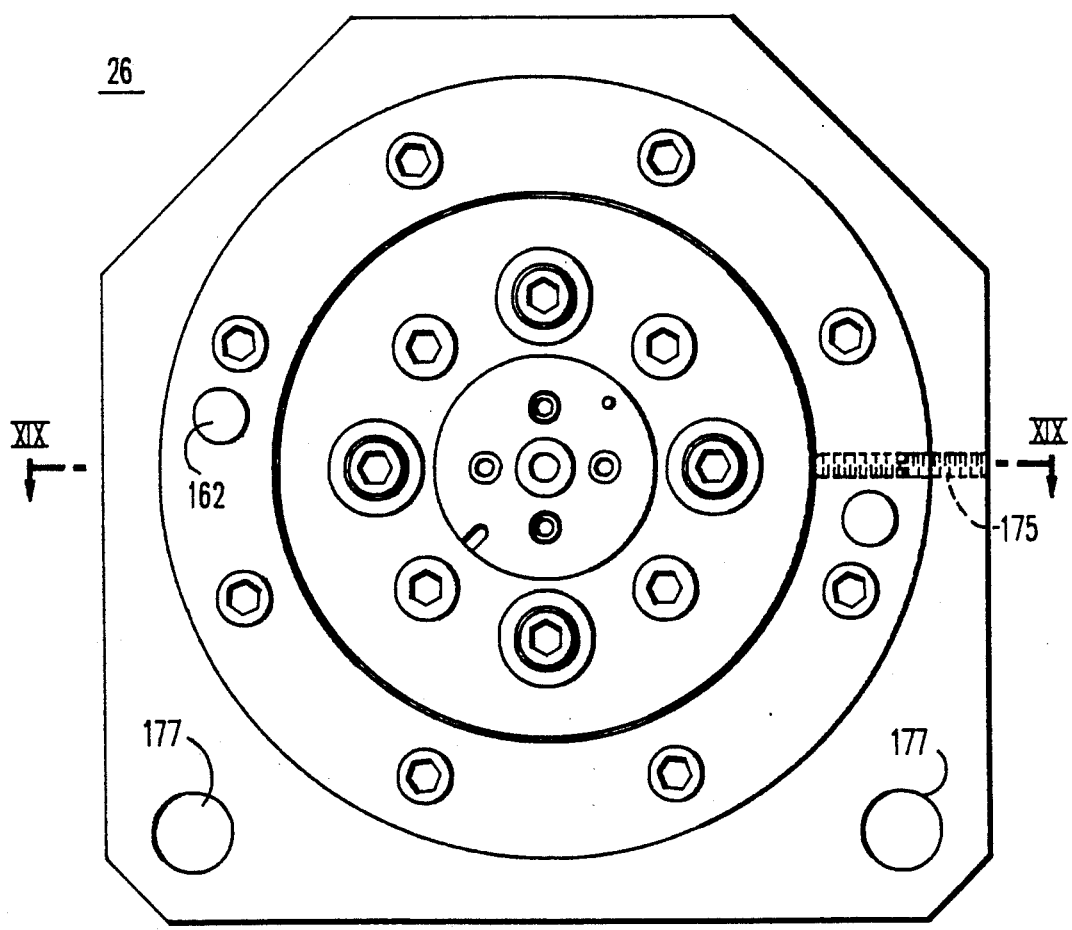

The ball bearing embodiment shown in FIGS. 18A and 18B is preferred because of more dependable rotation and more precise location which is assured by the use of X-type Kaydon TM bearings.

The male mounting assembly 26 is shown with two mounting holes 177 which allow the assembly to be mounted to a structural member or to a rail for mobility.

In both embodiments shown in FIGS. 18A, 18B, 19A and 19B, the pins 162 engage notches in the latching ring so that the latching ring may be held stationary while the female coupling assembly and male coupling assembly are rotated by the end of arm actuator on the robot.

The male mounting assemblies shown in FIGS. 18A, 18B, 19A and 19B require the use of the solenoid locking pin 118, which may be carried by the female coupling assembly 10 as illustrated in FIG. 10, instead of the locking buttons. That is because the fixed pins 162 of FIGS. 18A, 18B, 19A and 19B would have to remain in contact with the locking buttons 91 and 93 (FIG. 10). The solenoid locking pin would be actuated electrically as is known.

The solenoid locking pin could also be used in the male mounting assembly instead of in the female coupling assembly. The solenoid locking pin could also be used in place of the detent 175.

Figure 21:
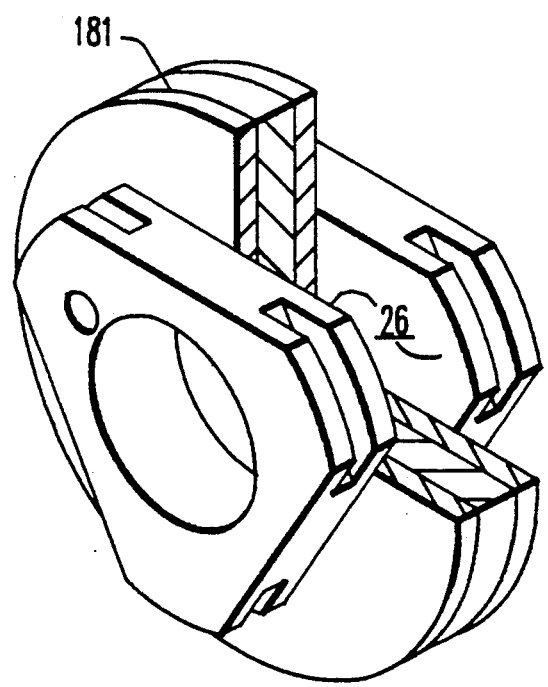
FIG. 21 illustrates an adapter.

In summary, the present invention is for a coupler which enables an end effector or tool to be coupled to the working end of a robot or service arm and which enables the robot or service arm to be connected to a base mount for receiving power and instructions. If the robot arm carries the male coupling assembly 26 on each end an adaptor (not shown) comprised of a pair of back to back female coupling assemblies 10 may be constructed to enable two or more robot arms to be connected together. Similarly, if the robot arm carries a female coupling assembly 10 on each end an adaptor, shown in FIG. 21, comprised of back to back male coupling assemblies 26 may be provided to enable two or more robot arms to be connected to one another.

The coupler of the present invention, when used in combination with a robot arm, can enable the robot arm to walk from mounting base to mounting base.

The coupler of the present invention is extremely short when compared to prior art couplers thus reducing the length between the end of the robot arm and the tool.

While the present invention has been described in connection with exemplary embodiments thereof, it should be understood that many modifications and variations will be readily apparent to those of ordinary skill in the art. This disclosure and the following claims are intended to cover all such modifications and variations.

What is claimed is:

1. A ring latched coupler, comprising:
   a male assembly having a plurality of grooves formed therein;
   a complementary female assembly adapted to receive said male assembly, said female assembly having a plurality of slots formed therein; and
   a latching ring rotatably carried by said female assembly, a fixed working surface of said latching ring being configured such that upon relative rotation of said male and female assemblies and said ring, said fixed working surface extends through said slots of said female assembly to engage said grooves of said male assembly so as to effect engagement with said male assembly;
   said coupler additionally comprising a plurality of stop pins carried by said female assembly for limiting the rotation of said latching ring, and said latching ring including a plurality of notches for enabling said latching ring to be held stationary during rotation of said male and female assemblies.

2. The coupler of claim 1, additionally comprising a plurality of locking buttons carried by said female coupling assembly for engaging said notches of said latching ring.

3. A ring latched coupler, comprising:
   a male assembly having a plurality of grooves formed therein;
   a complementary female assembly adapted to receive said male assembly, said female assembly having a plurality of slots formed therein; and
   a latching ring rotatably carried by said female assembly, a fixed working surface of said latching ring being configured such that upon relative rotation of said male and female assemblies and said ring, said fixed working surface extends through said slots of said female assembly to engage said grooves of said male assembly so as to effect engagement with said male assembly;
   wherein said female assembly includes a base carrying a member which extends substantially vertically from said base, said vertical member being substantially triangularly-shaped and having one of said plurality of slots respectively formed in each point of the triangle;
   and further wherein said male assembly includes a protruding triangularly-shaped member having one of said plurality of grooves respectively formed in each point of the triangle, said triangularly-shaped member adapted to received by said vertically extending member of said female assembly.

* * * * *